July 23, 1968  T. R. SMITH ET AL  3,393,883
AIRCRAFT LANDING GEAR
Filed June 6, 1966
5 Sheets-Sheet 1
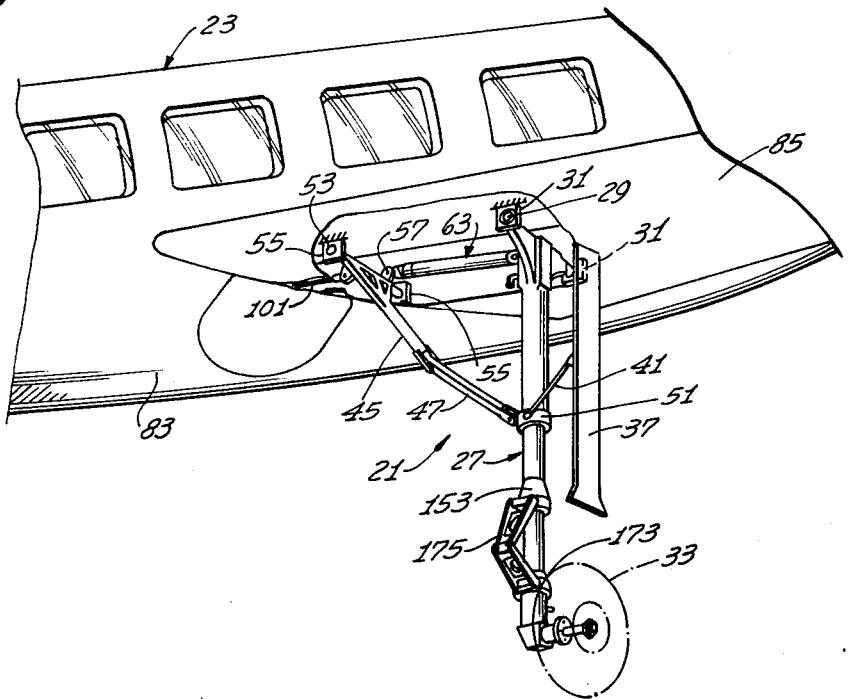
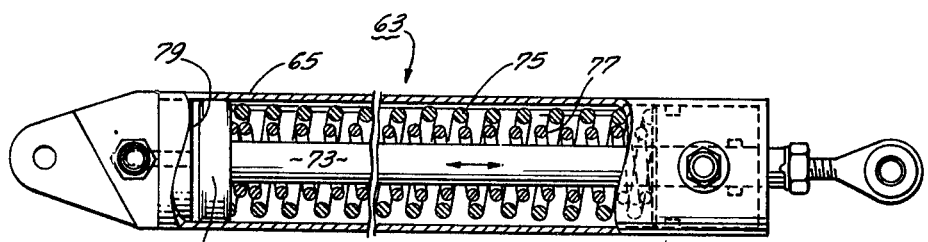
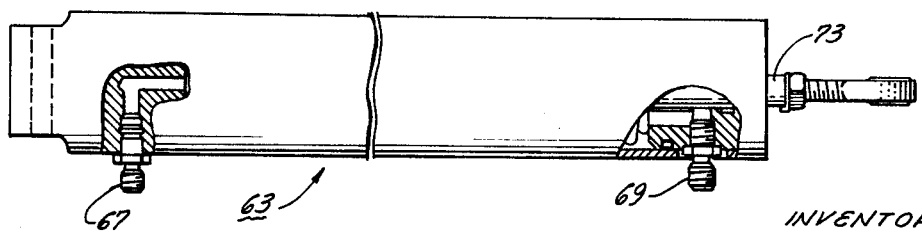
INVENTORS
THEODORE R. SMITH
RICHARD G. REESE
ATTORNEYS

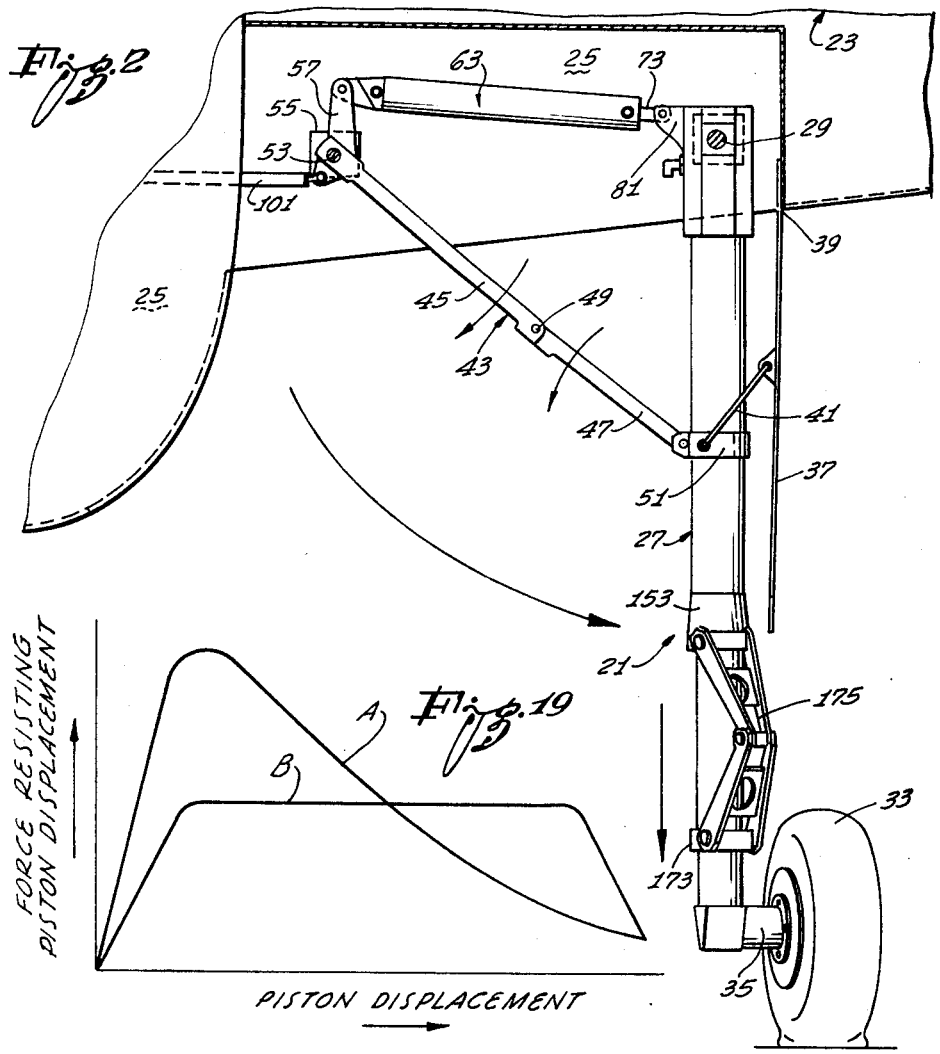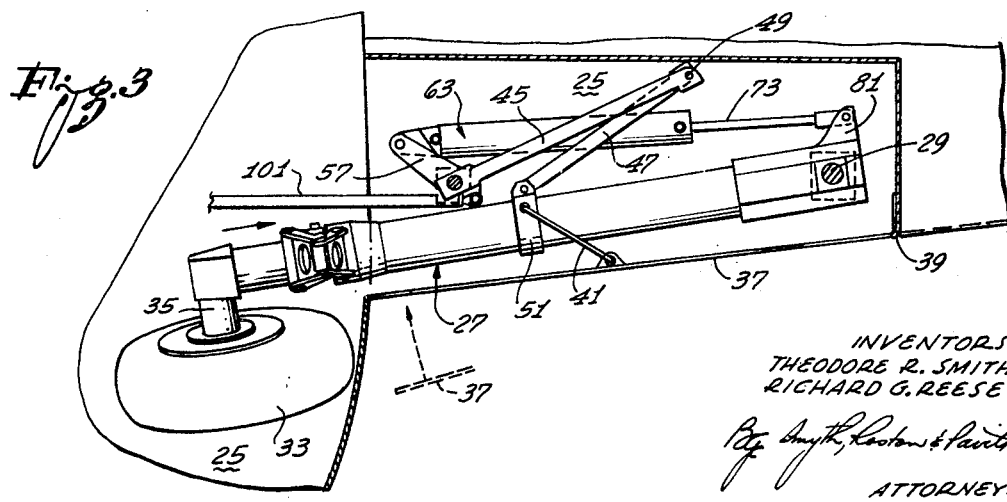

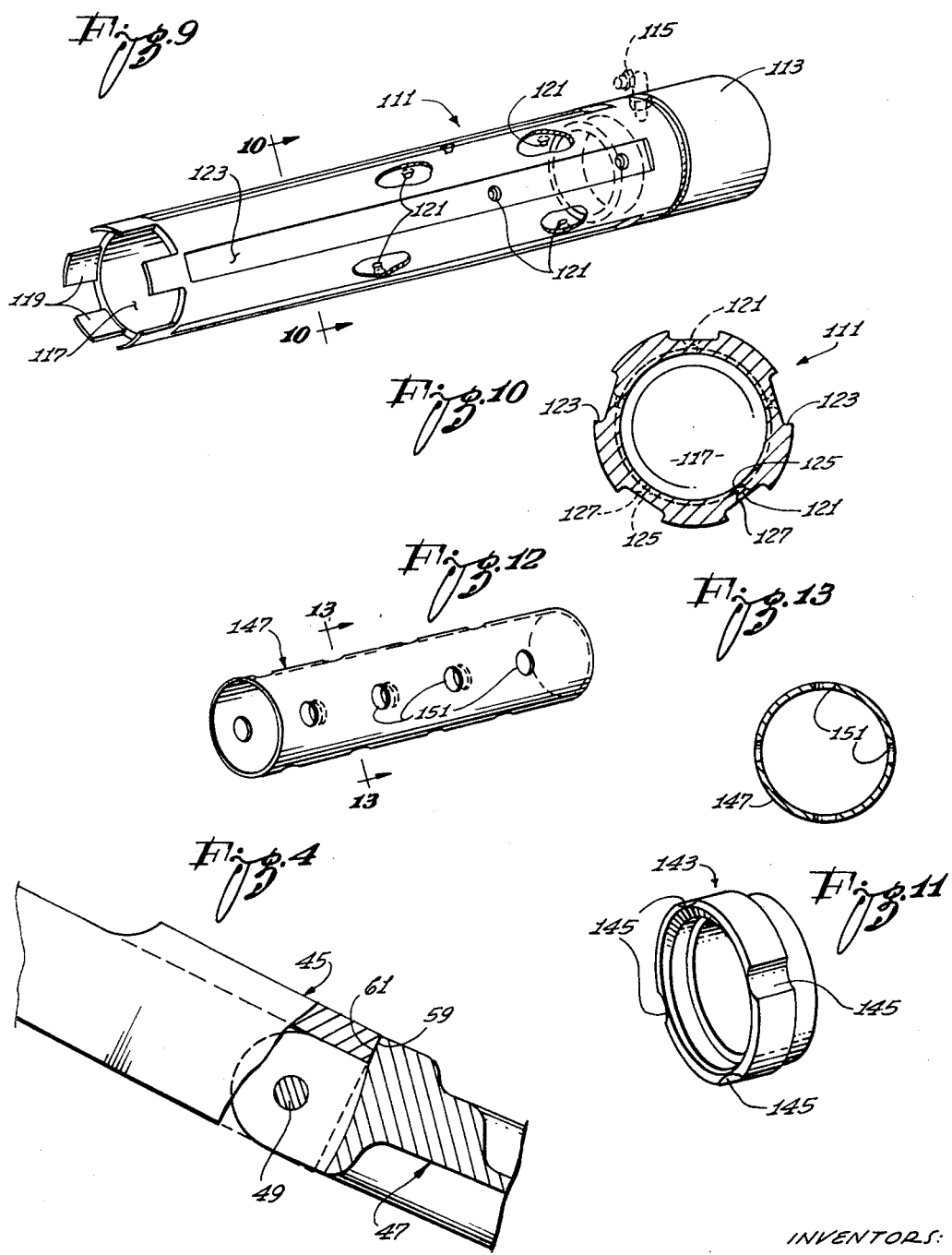

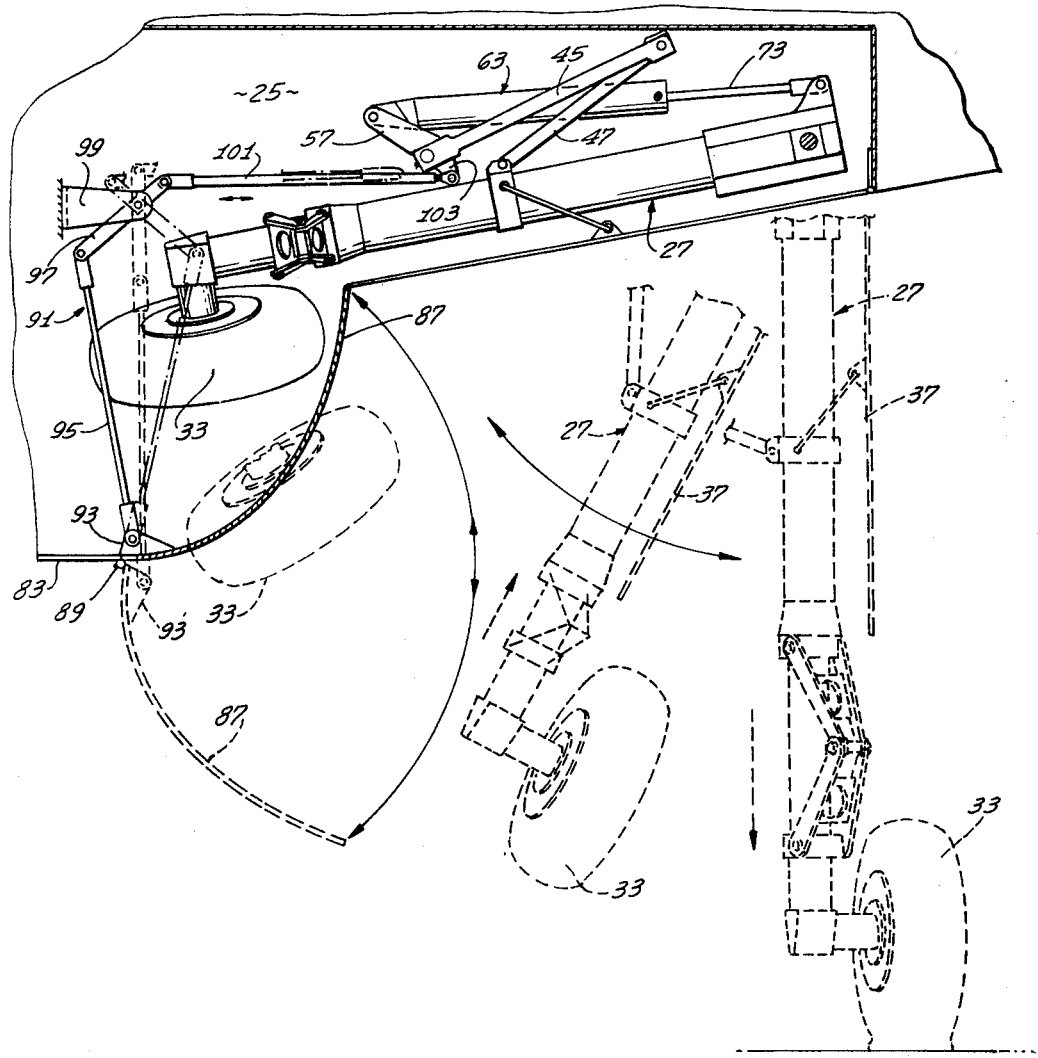

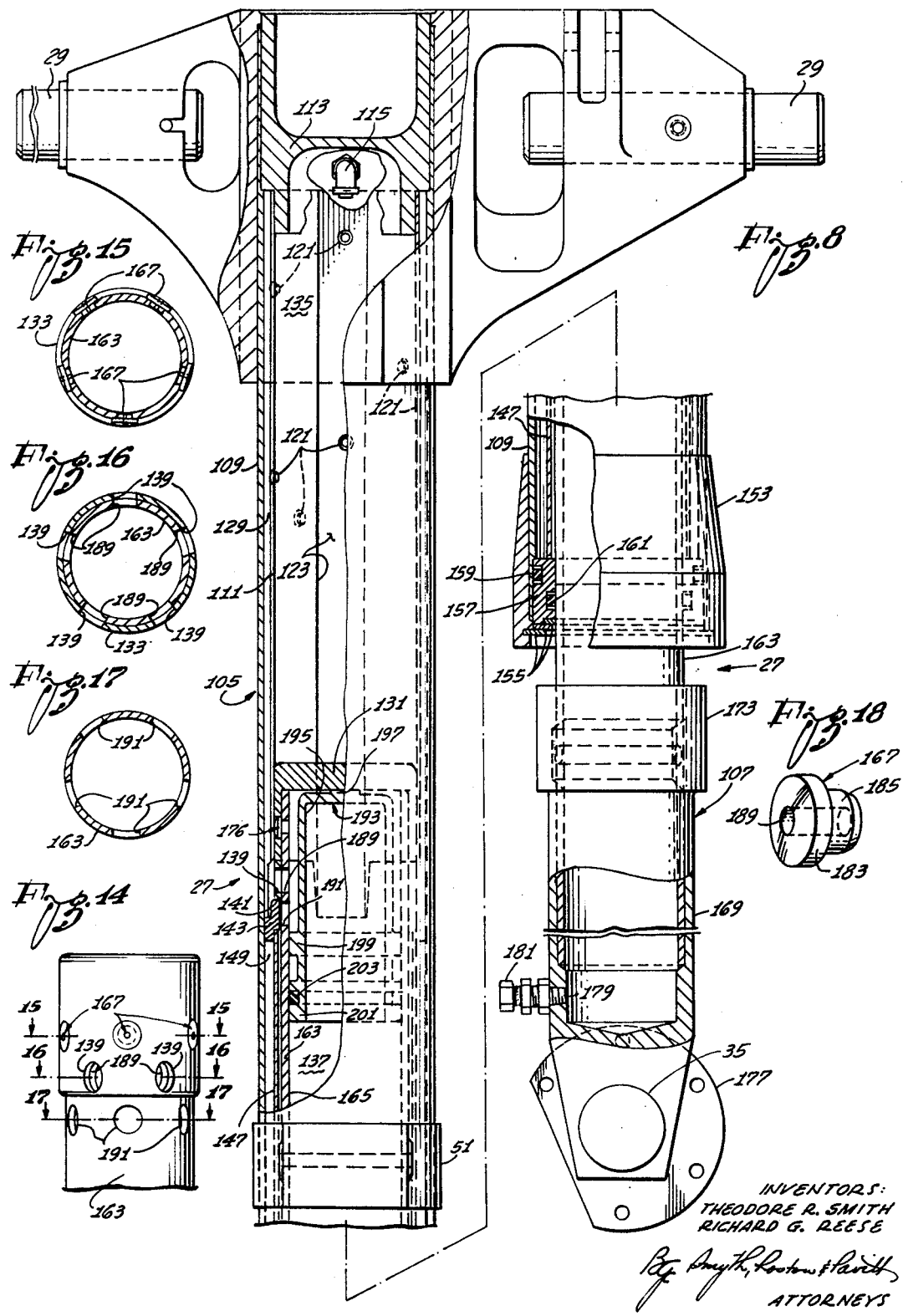

United States Patent Office 3,393,883
Patented July 23, 1968

3,393,883
AIRCRAFT LANDING GEAR
Theodore R. Smith, Los Angeles, and Richard G. Reese, Hacienda Heights, Calif., assignors to Ted Smith Aircraft Company, Inc., Northridge, Calif., a corporation of California
Filed June 6, 1966, Ser. No. 555,367
16 Claims. (Cl. 244—102)

This invention relates to a shock absorbing rectractable landing gear for an airplane.

As is well known, when the wheels of the airplane touch down on the runway, the aircraft is subjected to an impact or shock force caused by the rapid deceleration of the plane in the vertical direction. Therefore, it is common practice to incorporate a shock absorber in aircraft landing gear. If the shock absorber is not of good quality and fails to adequately absorb the impact upon landing, the occupants of the aircraft may be injured and the airplane may be damaged. Therefore, it is important that the shock absorber be reliable and smoothly absorb the landing impact.

One type of prior art shock absorbing landing gear includes a cylinder, a piston slidably mounted within the cylinder, and a noncompressible fluid within the cylinder on which the piston acts. The piston is provided with a fixed area orifice and the piston and cylinder are connected between the airplane and the airplane wheel to act as a shock absorber. The initial touch down is at a relatively high velocity which moves the piston against the noncompressible fluid in the cylinder, thereby forcing the fluid out of the fixed area orifice in the piston at a high velocity. As the orifice is sized to allow a relatively low rate of flow therethrough, initially the movement of the piston is very substantially retarded, thereby creating a shock absorbing effect.

This type of landing gear is very ineffective, transmits a very high initial shock to the airplane and its occupants, and absorbs the shock of landing at an irregular rate. The primary reason for this is that the orifice through which the noncompressible fluid is expelled is of fixed diameter. Thus, the first incremental portion of piston displacement within the cylinder, which is at a relatively high velocity, is very strenuously resisted by the fluid, thereby resulting in a high initial shock to the aircraft. However, as piston displacement continues and the downward velocity of the airplane is reduced, the flow through the fixed area orifice is reduced and the resistance of fluid flow through the orifice reduces rapidly. Thus, a relatively large portion of the landing impact is absorbed during a short time period and this causes a high impact load on the aircraft.

FIG. 19 shows a graph of piston displacement versus the force resisting piston displacement. The curve designated by reference character A is for a shock absorbing landing gear having a fixed area orifice. Curve A rises rapidly and then tapers off to a static condition in which the airplane is moving.

Another type of prior art landing gear sought to avoid the high initial impact force by utilizing a tapering pintle and other appurtenances to gradually close down the effective orifice area as the piston is displaced. Although this reduces the initial impact by initially affording a large effective orifice diameter, the resulting shock absorber is a complicated and quite expensive structure. The tapered pintle requires accurate machining and is subject to becoming axially disaligned from the orifice in the piston. Such disalignment causes changes in the orifice coefficient which in turn affects the flow rate through the orifice and the shock absorbing qualities of the device.

When a retractable landing gear is used, it is frequently desirable to provide an over-center toggle device for locking the landing gear in the landing position. An exposed resilient cord is often provided for biasing the wheels to the "down" or landing position so that if the conventional fluid actuating system for the landing gear fails, the resilient cord is operative to lower the landing gear. This arrangement is undesirable because the exposed resilient cord requires some additional space and is subject to damage and weathering.

The present invention eliminates the problems identified above. More particularly, the present invention provides a simple and reliable shock absorbing landing gear which eliminates the high initial shock applied to the aircraft by some of the prior art landing gears. The landing impact is opposed by a force which rises to a relatively low maximum value and then remains substantially constant during substantially all of the piston displacement. This is accomplished by a relatively simple and inexpensive structure which does not employ the accurately machined pintle of the prior art. Furthermore, the landing gear of this invention provides for a safety device for lowering the landing gear in the event of a hydraulic failure. This safety device is protected from weathering and damage and does not require any additional space within the aircraft.

A preferred form of the invention includes a strut with a first section having a passageway therein and a second section at least partially in the passageway of the first section. A first piston is slidably mounted in the passageway and is preferably connected to the second section of the strut for movement therewith. The space in the passageway on one side of the piston defines a reservoir for containing a fluid which is preferably noncompressible, and the space in the passageway on the other side of the piston defines a compression chamber. The strut is connected between the wheel of the aircraft and the aircraft itself.

Orifice means are provided in the wall of the first section of the strut in communication with the reservoir for bleeding fluid from the reservoir. The landing impact displaces the piston further into the passageway to reduce the volume of the reservoir and force at least some of the fluid through the orifice means. As the piston is displaced through the reservoir, it progressively closes the orifice means. Thus, a variable area orifice which does not require the tapered pintle of the prior art is simply and inexpensively provided.

The orifice means can be sized, shaped and located to cause the landing impact to be absorbed in whatever manner is desired. It is preferred that the orifice means include a plurality of longitudinally spaced orifices which are progressively and sequentially closed by the piston as it is displaced in the reservoir. It is also preferred to space the orifices longitudinally to provide a substantially constant force for resisting or absorbing the landing impact. The orifices may be formed by a simple drilling operation.

The fluid is bled from the reservoir through the orifices and passage means formed in the strut to the compression chamber on the other side of the first piston. A second or compressing piston is slidably mounted in the compression chamber. A compressible fluid, such as air, is supplied to the compression chamber to urge the compressing piston toward the first piston. In order for the fluid from the reservoir to enter the compression chamber, it must move the compressing piston away from the first piston, thereby compressing the air in the compression chamber. Thus, the compressing piston acts to separate the air from the noncompressible fluid and to resist the flow of the latter fluid into the compression chamber. The compressed air forms a cushion on which the airplane may rest under static conditions.

The landing gear of this invention is retractable into a recess in the underside of the airplane. The upper end of the strut is pivotally secured to the airplane and an over-center toggle link device is connected to the strut and pivotally secured to the airplane. A fluid responsive piston-cylinder actuator is interconnected between the strut and the over-center toggle link device to cause the latter to extend and retract the landing gear.

A spring is provided for urging the landing gear to the landing position and the over-center toggle link device to its locking position. Thus, if a hydraulic failure occurs, the landing gear can be lowered to the landing position and locked therein by the spring. The spring is retained within the housing of the actuator and therefore requires no additional space and is protected from weathering and other damaging forces.

The portion of the recess in the airplane that receives the wheel of the landing gear may be opened and closed by a door which is hinged to the airplane. The door closes this portion of the recess when the landing gear is in either of the landing or retracted positions and opens this portion of the recess when the landing gear is in a position intermediate the landing and retracted positions. This function is accomplished automatically by a linkage which interconnects the door and the over-center toggle device. The linkage includes a rigid link that is rigidly affixed to the door adjacent the hinge thereof to permit full opening of the door in response to a relatively small motion of the linkage.

The invention, both as to its organization and method of operation, together with further features and advantages thereof, may best be understood by reference to the following description taken in connection with the accompanying drawings in which:

FIG. 1 is a fragmentary perspective view showing a landing gear constructed in accordance with the teachings of this invention, the landing gear being illustrated in the landing position;

FIG. 2 is an enlarged fragmentary front elevational view of the landing gear in the landing position;

FIG. 3 is a fragmentary front elevational view of the landing gear in the retracted position;

FIG. 4 is an enlarged fragmentary elevational view partially in section of a portion of the over-center toggle device;

FIG. 5 is an enlarged sectional view of the actuator for lowering and retracting the landing gear;

FIG. 6 is a plan view partially in section of the actuator;

FIG. 7 is a fragmentary front elevational view of the landing gear illustrating the linkage for operating the door;

FIG. 8 is a side elevational view partially in section illustrating the gear strut;

FIG. 9 is a perspective view of an inner cylinder which forms a portion of the strut;

FIG. 10 is a sectional view taken along line 10—10 of FIG. 9 illustrating the circumferential arrangement of the orifices;

FIG. 11 is a perspective view of the annular stop;

FIG. 12 is a perspective view of the perforated sleeve that supports the annular stop;

FIG. 13 is a sectional view taken along line 13—13 of FIG. 12;

FIG. 14 is a fragmentary elevational view of the piston and the lower section of the strut which is affixed thereto;

FIGS. 15, 16 and 17 are sectional views taken along lines 15—15, 16—16, and 17—17, respectively, of FIG. 14;

FIG. 18 is an enlarged perspective view of one of the pins that interconnects the piston and the lower section of the strut; and FIG. 19 is a graph of force versus piston displacement for a prior art shock absorbing landing gear and the device of this invention.

Referring to the drawings, and in particular to FIGS. 1–3 thereof, reference numeral 21 designates a landing gear constructed in accordance with the teachings of this invention and attached to an airplane 23. The landing gear 21 is retractable into a recess 25 on the underside of the airplane 23.

Generally, the landing gear 21 includes a strut 27 pivotally secured at its upper end by pins 29 (FIG. 8) to mounting lugs 31 depending from the airplane 23 within the recess 25. A wheel 33 is rotatably mounted on a shaft 35 which is secured to the lower end of the strut 27. The strut 27 and the wheel 33 are pivotable between the landing position shown in FIGS. 1 and 2 and the retracted position shown in FIG. 3.

The recess 25 is partially closed by an elongated strip 37 of sheet metal which is secured to the airplane by a hinge 39 and is connected to the first strut 27 by a link 41. Thus, the strip 37 is automatically pivoted to close a portion of the recess 25 when the strut 27 is pivoted to the retracted position of FIG. 3.

An over-center toggle link device 43 is provided for locking the wheel 33 in the landing position and for transmitting a force for extending and retracting the landing gear. The toggle link device 43 includes links 45 and 47 hinged together at their inner ends by a pin 49 (FIG. 4). The outer end of the link 47 is suitably pivotally attached to a collar 51 which is fixed to the strut 27. The outer end of the link 45 is suitably pivotally mounted to a fixed portion of the airplane within the recess 25 as by a pin 53 and depending ears 55. The link 45 has a crank arm 57 integral therewith and extending angularly therefrom.

FIG. 4 illustrates a stop means formed by the engagement of the faces 59 and 61 of the links 45 and 47, respectively. This stop means limits the maximum over-center position to which the toggle link device 43 may be moved.

An extendible actuator 63 is provided for moving the landing gear between the extended and collapsed positions. As best seen in FIGS. 5 and 6, the actuator 63 includes a hollow housing or cylinder 65 having fluid passages 67 and 69 for connection to a suitably controlled fluid source (not shown), a piston 71 slidably mounted within the cylinder 65, and a connecting rod 73 rigidly secured at one end to the piston and extending axially through the cylinder to a point outside the cylinder. A pair of concentric coil springs 75 and 77 urge the piston 71 toward an inner end wall 79 of the cylinder 65 and thereby urge the connecting rod 73 inwardly. The springs 75 and 77 are sized so that they will be compressed even when the piston 71 engages the inner end wall 79 and, therefore, the connecting rod 73 is always urged to its retracted position within the cylinder 65.

As shown in FIGS. 1–3, the cylinder 65 is connected to the crank arm 57, and the connecting rod 73 is connected to a bracket 81 on the strut 27 above the pivotal axis of the pins 29. It is apparent that by connection of the passages 67 and 69 of the actuator 63 to an appropriate fluid system, the connecting rod 73 may be extended against the force of the springs 75 and 77 or retracted within the cylinder 65.

Assuming that the landing gear is in the retracted position (FIG. 3), it can be lowered to the landing position by retracting the rod 73 within the cylinder 65. Thus retraction of the rod 73 will rotate the link 45 clockwise to urge the pin 49 downwardly to the maximum over-center position shown in FIGS. 1 and 2. The engagement of the faces 59 and 61 (FIG. 4) prevent further movement of the toggle link device 43 past the center position. With the landing gear in the position of FIGS. 1 and 2, forces directed laterally inwardly against the wheel 33 are prevented from pivoting the strut 27 by the engagement of the faces 59 and 61 (FIG. 4). Forces in the opposite direction merely tend to move the over-center toggle link device 43 to the dead-center position and when such forces are terminated, the springs 75 and 77 urge the over-center toggle link device back to the locking position shown in FIG. 4. To retract the landing gear, the connecting rod 73 is extended from the cylinder 65.

With reference to FIGS. 1 and 7, it can be seen that the recess 25 lies partly within the fuselage 83 and partly within the wing 85 of the airplane. The wheel 33 passes through an opening in the fuselage 83 in moving between the extended and retracted positions. The opening in the fuselage can be covered by a door 87 which is secured to the fuselage by a hinge 89.

Linkage means 91 pivots the door 87 to close the opening in the fuselage when the strut 27 and the wheel 33 are in either of the landing or retracted positions and pivot the door to open such opening when the strut and wheel are in a position intermediate said landing and retracted positions. As best seen in FIG. 7, the linkage means 91 includes a rigid link 93 rigidly affixed to the interior of the door 87 and extending generally obliquely into the interior of the recess 25. The inner end of the link 93 is povitally attached to an intermediate link 95, which is pinned to a lever 97, which is pivotally mounted intermediate its ends to a fixed tab 99 within the recess 25. A driving link 101 interconnects the inner end of the lever 97 with an ear 103 of the crank arm 57.

Assuming that the landing gear is in the retracted position shown in full lines in FIG. 7, actuation of the actuator 63 to move the landing gear to the landing position tends to rotate the crank arm 57 in the clockwise direction and this pivots the lever 97 in the counterclockwise direction toward the vertical position shown in phantom in FIG. 7. As the lever 97 approaches the vertical position, the door 87 is opened to allow the wheel 33 to be moved through the opening in the fuselage and out of the recess 25. The vertical position of the lever 97 corresponds to the full open position of the door 87. As the actuator 63 continues to drop the landing gear, the lever 97 is rotated counterclockwise past the vertical position, thereby closing the door. The door 87 reaches its fully closed position when the landing gear reaches the landing position. Thus, the door 87 is closed when the landing gear is in either of the retracted or landing positions. The construction of the linkage means 91 causes pivoting of the door 87 through a relatively large angle in response to a relatively small amount of movement of the lever 97.

The details of the strut 27 and the manner in which the unique shock absorbing function is performed can best be understood by reference to FIG. 8. Generally, the strut 27 includes a tubular upper section 105 and a tubular lower section 107 telescoped within the upper section 105. The upper section 105 includes an outer cylinder or tube 109, an inner cylinder or tube 111 pressed within the outer cylinder, and an upper end cap 113 secured to the cylinders 109 and 111. The upper section 105 has an inlet port and connection 115 for the filling of a fluid, preferably a noncompressible fluid, such as oil, into the interior of the inner cylinder 111. The cap 113 has an annular abutmet portion 118 extending into the interior of the cylinder 111.

The details of the inner cylinder 111 can best be seen in FIGS. 9 and 10. The inner cylinder 111 defines a cylindrical passageway 117 and the lower end of the inner cylinder is notched to form a plurality of longitudinally extending fingers 119. The wall of the inner cylinder contains a plurality of longitudinally spaced orifices 121. As best seen in FIG. 10, the orifices are also spaced circumferentially to define five longitudinally extended linear rows of orifices. Five lingitudinally extending channels 123 interconnect each orifice 121 with the other orifices in that particular row.

Each of the orifices 121 is preferably formed by drilling. Each of the orifices 121 has an inner cylindrical portion 125 and an enlarged frusto conical flared portion 127.

With the inner cylinder 111 assembled within the outer cylinder 109, the channels 123 cooperated with the interior wall of the outer cylinder 109 to form longitudinal passage means 129 (FIG. 8).

Slidably mounted in the passageway 117 of the inner cylinder 111 is a piston 131 having a depending skirt portion 133. The space in the passageway 117 above the piston 131 defines a reservoir 135 which contains a reservoir fluid, preferably a noncompressible fluid, such as oil, and the portion of the passageway beneath the piston 131 partially defines a compression chamber 137. The skirt portion 133 of the piston 131 has a plurality of circumferentially spaced circular apertures 139 and the lower end of the skirt portion forms an annular shoulder 141.

The piston 131 is prevented from falling out of the lower end of inner cylinder 111 by an annular stop 143 (FIGS. 8 and 11). The annular stop 143 has four circumferentially spaced grooves 145 that allow fluid to flow from the passage means 129 to the space beneath the annular stop.

The annular stop 143 engages the interior wall surface of the outer cylinder 109 and is supported by a sleeve 147. The sleeve 147 is spaced from the interior wall surface of the outer cylinder 109 to form an annular cavity 149. As best seen in FIGS. 12 and 13, the sleeve 147 is a hollow right-circular cylinder having a plurality of circular perforations 151 therein. The perforations 151 allow fluid to pass from the annular cavity 149 to the interior of the sleeve 147 so that the sleeve will not be subjected to external fluid pressure which might tend to collapse it.

As best seen in FIG. 8, the lower ends of the outer cylinder 109 and the sleeve 147 terminate in a collar 153. The lower end of the collar 153 supports three rings 155 on which an annular member 157 rests. The uppermost ring 155 is a wiper ring which prevents the entry of dirt and other contaminants into the strut 27. The lower end of the outer cylinder 109 is sandwiched between the annular member 157 and the collar 153 and the lower end of the sleeve 147 abuts the upper surface of the annular member 157. The annular member 157 carries an O-ring seal 159 for sealingly engaging the outer cylinder 109 and a second O-ring seal 161 for sealingly engaging the lower section 107.

The lower section 107 of the strut 27 includes a cylindrical tube 163 having a cylindrical passage 165 extending axially therethrough which defines another portion of the compression chamber 137. The upper end of the tube 163 is telescoped within the skirt portion 133 of the piston 131 and is secured thereto by a plurality of pins 167. Thus, the piston 131 serves as a cap for the tube 163 and they are slidable together as a unit.

The lower end of the tube 163 is secured within a sleeve 169, the lower end of which is closed by an end wall 171. The upper end of the sleeve 169 is enlarged to form a flange 173. As best seen in FIGS. 1 and 2, a scissors connector 175 interconnects the flange 173 with the collar 153. The scissors connector 175 prevents the sleeve 169 from rotating axially relative to the upper section 105. As shown in FIG. 8, the shaft 35 is connected to a drum 177 of the wheel 33.

The lower end of the sleeve 169 adjacent the end wall 171 is provided with an inlet port 179 and a connector 181. The connector 181 may be connected into a suitably controlled source of a compressible fluid, such as air. Thus, air is supplied to the compression chamber 137, the compression chamber being defined by the piston 131, the tube 163, and the sleeve 169.

With reference to FIGS. 8 and 14–18, it can be seen that the piston 131 is connected to the tube 163 by five of the pins 167. Preferably, each of the pins 167 (FIG. 18) has a head portion 183, a shank portion 185, and an axial aperture 187 extending therethrough.

As best seen in FIGS. 8, 14 and 16, the upper end portion of the tube 163 has five circular holes 189 coextensive with and in registry with the five apertures 139 formed in the skirt portion 133 of the piston 131. The apertures 139 and the holes 189 provide communication between the passage means 129 and the compression chamber 137. A second group of five circular holes 191 is formed in the tube 163 spaced downwardly slightly from the holes 189 (FIGS. 8, 14, and 17). As the piston 131 and the tube 163 move upwardly from the position shown in FIG. 8, the holes 191 continue to provide communication between the passage means 129 and the compression chamber 137.

Slidably mounted within the tube 163 is a compressing piston 193 which includes a sleeve portion 195 and an end wall 197 closing the upper end of the sleeve portion. The sleeve portion 195 is spaced radially inwardly of the tube 163 throughout most of its length, but is provided with two annular guiding flanges 199 and 201 which slidably engage the tube 163. The guiding flange 201 retains a resilient O-ring seal 203 which sealingly engages the tube 163. Thus, the compressing piston 193 separates the oil from the reservoir 135 from the air which is admitted through the connector 181.

The operation of the shock absorber portion of the landing gear is as follows: Immediately after the landing gear has been lowered by the actuator 63, the components thereof will be in the position shown in FIG. 8. In this position, the piston 131 and the tube 163 are in their lowermost position with the annular shoulder 141 of the piston engaging the annular stop 143. The reservoir 135, the passage means 129, the annular cavity 149, the annular space between the sleeve 147 and the tube 163, and the annular space between the compressing piston 193 and the tube 163 are all filled with the noncompressible fluid. The portion of the compression chamber 137 beneath and within the compressing piston 195 is filled with air or another compressible fluid.

When the wheels 33 of the airplane touch down on the runway, the force of the impact acts upwardly through the wheels and the tube 163 to urge the piston 131 and the tube 163 upwardly relative to the upper section 105 of the strut 27. Such movement of the piston 131 reduces the size of the reservoir 135, thereby causing fluid to be expelled through the orifices 121 into the passage means 129, through the apertures 139 and the holes 189, and into that portion of the compression chamber 137 which is filled with the noncompressible fluid. Such movement of the fluid from the reservoir 135 is resisted by the sum of the pressure drops across all of the orifices 121 and by the force required to depress the piston 195 to further compress the air therebelow. As explained hereinabove, when the flow rate through an orifice is high, the pressure drop thereacross is also very high and would under ordinary circumstances produce a high shock or impact on the airplane. However, this is compensated for by the present invention in that initially all of the orifices 121 are exposed to the fluid within the reservoir 135. Thus, the total effective orifice area is maximum and the initial fluid flow rate is lower than would be for a smaller fixed orifice. Furthermore, initially the piston 193 offers little resistance to the flow of oil into the compression chamber 135 because the air therein has not yet been highly compressed.

To prevent a drop in the force resisting the landing impact, and to enable the total landing energy to be absorbed during the shock absorber stroke, the orifices 121 are spaced longitudinally along the inner cylinder 111 so that the piston 131 will progressively close the orifices as it is displaced upwardly in the reservoir 135. Thus, the flow rate through the decreasing effective orifice area remains somewhat constant and the sum of the pressure drops across the orifices 121 is not reduced as it would be if a fixed area orifice were used. Furthermore, the piston 193 offers progressively increasing resistance to the entry of oil into the compression chamber 137 as the air therebelow becomes further compressed.

The size, shape, number, and location of the orifices 121 and the pressure of the air supplied to the compression chamber 137 may all be varied to provide shock absorption at the desired rate. The preferred rate of shock absorption is illustrated by the curve B in FIG. 19. It will be noted that the curve B rises rapidly to a predetermined force level and remains substantially constant at this force level throughout substantially the full displacement of the piston 131. The curve B has a slope of approximately zero through substantially all of the piston displacement. This indicates that the landing gear of this invention smoothly and evenly absorbs the landing impact. Under static conditions, the weight of the aircraft is supported by the air compressed beneath the piston 195.

Of course, the smooth curves A and B of FIG. 19 represent approximations of actual landing conditions. The areas beneath each of the curves A and B represent energy absorbed during landing. Thus, it is apparent that a shock absorbing landing gear functioning as represented by the curve B smoothly absorbs the energy created during landing.

Selecting values for the above-noted variables will depend upon the weight of the airplane involved and is a difficult and tedious problem. Generally, to get the curve B as flat as possible it is necessary to vary the orifice diameter and the orifice location. However, it is believed that a relatively flat curve may be obtained by varying only the orifice diameter.

Generally, it has been found that the orifices 121 will be denser near the center of the reservoir 135 than adjacent the ends when a relatively flat curve is desired. Although orifices of various shapes, including elongated slots, could be used, round orifices of equal diameter are preferred because orifice coefficients for round holes have been accurately established and round orifices are quickly and easily formed as by drilling.

By way of illustration, the following arrangement of orifices for a 4000 to 5000-pound airplane has been found very satisfactory. An inner cylinder 111 having an internal diameter of 2.5 inches and having an overall length of 12.6 inches was selected. A total of ten orifices, each having a diameter of .166 inch and having the shape illustrated in FIG. 10 were utilized. The orifices were provided in five longitudinally extending rows of two mesh. The distances from the upper end of the inner cylinder 111 to the axis of each of the orifices in inches is as follows: .75; 1.75; 2.50; 3.10; 3.75; 4.40; 5.00; 5.75; 6.75; and 7.75. To provide relatively even flow through the five passage means 129, the orifices 121 were arranged so that the piston 131 would sequentially close off the lower orifice in each of the passage means 129 and then sequentially close off the upper orifice 121 in each of the passage means in the same order.

It is apparent, therefore, that the shock absorbing landing gear disclosed herein is very reliable in that the total effective orifice area can be varied without error. The entire shock absorbing system is very easy to construct and merely requires the drilling of the orifices 121 in the cylinder 111.

Although an exemplary embodiment of the invention has been shown and described, many changes, modifications and substitutions may be made by one having ordinary skill in the art without necessarily departing from the spirit and scope of this invention.

What is claimed is:
1. In a landing gear for an airplane, the combination of:
   a strut including a first section having a passageway therein, a second section at least partially within said passageway of said first section, and means for interconnecting said sections to permit relative movement therebetween;
   a first piston slidably mounted in said passageway, the space in said passageway on one side of said piston defining a reservoir for containing a reservoir fluid and the space in said passageway on the other side of said piston at least partially defining a chamber;
   longitudinally arranged orifice means in the wall of said first section for bleeding the fluid from the reservoir;

means for drivingly connecting said piston and said second section;
a wheel;
means for drivingly securing one of said sections to said wheel; and
means for drivingly securing the other of said sections to the airplane, impact during landing displacing said second section and said piston further into said passageway to reduce the volume of said reservoir and force at least some of the reservoir fluid through said orifice means, said piston progressively closing said orifice means as the volume of said reservoir is reduced.

2. A combination as defined in claim 1 including passage means at least partially in said strut connecting said orifice means with said chamber and movable means in said chamber for resisting the flow of reservoir fluid from said passage means into said chamber.

3. A combination as defined in claim 2 wherein said second section includes a tube, said connecting means includes means for connecting said tube and said first piston, said movable means includes a second piston slidably mounted in said tube, said passage means extending through said tube to allow reservoir fluid to enter said chamber and urge said second piston in one direction within said compression chamber, and said chamber having a compressible fluid therein for resisting movement of said second piston in said one direction.

4. A combination as defined in claim 1 wherein said first section includes an inner tube defining said passageway and an outer tube telescoped over said inner tube and affixed thereto, said inner tube being spaced radially inwardly from said outer tube over at least a portion of the lengths of said tubes to at least partially define longitudinal passage means interconnecting said orifice means and said chamber.

5. A combination as defined in claim 1 wherein said orifice means includes a plurality of separate orifices spaced longitudinally along a portion of said first section of said strut, the density of said orifices being greater adjacent the center of said portion of said first strut than adjacent the ends of said portion of said first strut.

6. A combination as defined in claim 1 wherein said one section is said second section of said strut and said other section is said first section of said strut.

7. A combination as defined in claim 1 wherein said connecting means includes means for attaching said first piston to said second section, said first piston having an annular shoulder, said interconnecting means including an anular stop fixed to said first section, surrounding said second section and engageable with said annular shoulder of said first piston to prevent said sections from separating.

8. A combination as defined in claim 7 wherein said first section includes a perforated sleeve for supporting said annular stop, passage means are provided at least partially within said first section for interconnecting said orifice means and said chamber, means are provided within said chamber for resisting the flow of reservoir fluid from said passage means into said compression chamber, and said annular stop has holes therein communicating said passage means with said perforated sleeve.

9. A combination as defined in claim 1 wherein said orifice means includes a plurality of separate orifices spaced longitudinally to permit the impact during landing to be absorbed by a force which is substantially constant through substantially all of the displacement of said first piston.

10. A combination as defined in claim 1 including means to retract said strut and said wheel to a position within the airplane, said retracting means including an extendible fluid actuator for pivoting said strut and said wheel between a retracted position in which said strut and said wheel are within the airplane and a landing position, said fluid actuator including a housing, a member extendible from said housing in response to fluid pressure to move said strut and said wheel to said retracted position, and spring biasing means in said housing resisting the extension of said member from said housing and biasing said strut and said wheel toward said landing position.

11. In a landing gear retractible into a recess in the underside of an airplane, the combination of:
a strut;
a wheel mounted on said strut adjacent one end thereof;
means for pivotally mounting said strut adjacent the other end thereof to the airplane;
over-center toggle link means connected at one end to said strut and pivotally connected at the other end thereof to the airplane, said over-center toggle link means including stop means for positively limiting the amount said over-center toggle link means can move past center to thereby establish a maximum over-center position, said over-center toggle link means also including a crank arm;
an extendible fluid actuator connected adjacent one end thereof to said crank arm and adjacent the other end thereof to said strut for pivoting said strut and said wheel between a landing position in which said over-center toggle link means is in said maximum over-center position and a retracted position in which said strut and said wheel are within the recess in the airplane, said extendible fluid actuator including a housing and a member extendible from said housing in response to fluid pressure therein to rotate said crank and move said strut and said wheel to said retracted position; and
spring biasing means in said housing resisting extension of said member from said housing and biasing said over-center toggle link means toward said maximum over-center position.

12. A combination as defined in claim 11 including a door for covering the portion of the recess into which the wheel is received;
hinge means for securing said door to the airplane adjacent said portion of the recess to allow said door to open and close said portion of the recess; and
linkage means connected to said crank arm for pivoting said door to close said portion of the recess when said strut and wheel are in either of said landing or retracted positions and pivoting said door to open said portion of the recess when said strut and wheel are in a position intermediate said landing and retracted positions.

13. In a landing gear retractable into a recess in the underside of an airplane, the combination of:
a strut;
a wheel mounted on said strut adjacent one end thereof;
means for pivotally mounting said strut adjacent the other end thereof to the airplane;
over-center toggle link means interconnecting said strut and the airplane;
actuator means for moving said over-center toggle link means to pivot said strut and said wheel between a retracted position in which said strut and said wheel are within the recess and a landing position;
a door for closing a portion of the recess;
hinge means for securing said door to the airplane adjacent the recess for allowing movement of said door to open and close said portion of the recess;
a rigid link fixed to the interior of said door adjacent said hinge means and extending generally obliquely therefrom into the interior of the recess; and
linkage means interconnecting said rigid link and said over-center toggle link means for pivoting said door to close said portion of the recess when said strut and said wheel are in either of said landing or retracted positions and pivoting said door to open said said portion of the recess when said strut and said wheel are in a position intermediate said landing and retracted positions.

14. In a shock absorbing landing gear for connection between a wheel of an airplane and the airplane, the combination of:
an elongated member having a passageway therein;
a first piston slidably mounted in said passageway, the space within said passageway on one side of said first piston forming a reservoir for containing a fluid;
a plurality of longitudinally spaced orifices in said elongated member for bleeding the fluid from the reservoir in response to relative movement between said piston and said elongated member which reduces the volume of said reservoir;
one of said elongated member and said first piston being connectable to the wheel and the other of the elongated member and the first piston being connectable to the aircraft whereby the impact force of landing the airplane causes displacement of said piston relative to said elongated member to decrease the volume of said reservoir and force at least some of the fluid through said orifices and to progressively close said orifices as the volume of said reservoir is reduced;
means adjacent said elongated member defining a chamber;
a second piston slidably mounted in said chamber;
means for resiliently urging said second piston in a first direction in said chamber; and
means defining a passage interconnecting said orifices and said chamber to admit the fluid to said compression chamber so that reduction of the volume of said reservoir by said first piston forces at least some of the fluid into said chamber to urge the second piston in a second direction against the force of said resilient means.

15. A combination as defined in claim 14 wherein the impact force of landing the airplane is resisted by the sum of the pressure drops in pumping the fluid through said orifices and the secondary force required to move said second piston against the force of said resilient means, said orifices being spaced longitudinally along said elongated member so that the sum of the pressure drops thereacross plus said secondary force will remain substantially constant during substantially all of said displacement of said piston relative to said elongated member.

16. In a shock absorber drivingly connectable between movable members, the combination of:
a first strut section including an outer sleeve, an inner sleeve having a longitudinal passageway therein, and means mounting said inner sleeve in said outer sleeve;
a first piston slidably mounted in said passageway of said inner sleeve, the space within said passageway on one side of said first piston forming a reservoir for containing an at least substantially noncompressible fluid;
a plurality of orifices in said inner sleeve for bleeding the fluid from the reservoir in response to relative movement between said first piston and said inner sleeve in a manner to reduce the volume of said reservoir, at least some of said orifices being longitudinally spaced;
said inner and outer sleeves being spaced over at least a portion of their lengths to define passage means communicating with said orifices;
a second strut section including a tube member drivingly connected to said first piston and at least partially defining a compression chamber;
a second piston slidably mounted in said compression chamber, said compression chamber on one side of said second piston defining a space for carrying a compressible fluid for urging said second piston in a first direction in said chamber; and
aperture means interconnecting said passage means and said compression chamber whereby relative movement between the first piston and the inner sleeve forces at least some of the noncompressible fluid through the orifices, through said passage means and said aperture means to said compression chamber to urge said second piston in a second direction against the force of the compressible fluid, such relative movement between said first piston and said inner sleeve allowing said first piston to progressively close off said orifices.

References Cited

UNITED STATES PATENTS

| | | | |
|---|---|---|---|
| 2,548,832 | 4/1951 | Tydon | 244—101 |
| 2,621,004 | 12/1952 | Ashton et al. | 244—102 |
| 2,702,398 | 2/1955 | Marcus | 267—1 XR |
| 2,891,788 | 6/1959 | Stoner | 267—64 |
| 2,944,639 | 7/1960 | Blake | 188—100 XR |
| 2,946,582 | 7/1960 | Martin | 267—64 |

FOREIGN PATENTS

| | | |
|---|---|---|
| 119,316 | 12/1944 | Australia. |
| 849,258 | 8/1939 | France. |

FERGUS S. MIDDLETON, *Primary Examiner.*

P. E. SAUBERER, *Assistant Examiner.*